United States Patent [19]

Mizuno et al.

[11] 4,424,091

[45] Jan. 3, 1984

[54] TRANSFER SHEET WITH RESIST PORTIONS

[75] Inventors: Shogo Mizuno, Toride; Takao Suzuki, Kawagoe; Sadanobu Kawasaki; Hideichiro Takeda, both of Tokyo, all of Japan

[73] Assignee: Dai Nippon Insatsu Kabushiki Kaisha, Tokyo, Japan

[21] Appl. No.: 229,108

[22] Filed: Jan. 28, 1981

Related U.S. Application Data

[60] Division of Ser. No. 117,798, Feb. 1, 1980, Pat. No. 4,271,224, which is a continuation of Ser. No. 864,486, Dec. 27, 1977, abandoned.

[30] Foreign Application Priority Data

Dec. 29, 1976 [JP] Japan ................................ 51-158772

[51] Int. Cl.³ ............................ B44C 3/02; B32B 5/16

[52] U.S. Cl. ........................................ 156/234; 8/470; 156/240; 428/207

[58] Field of Search .................... 8/446, 452, 456, 467, 8/468, 471, 470; 428/207; 156/240, 234

[56] References Cited

U.S. PATENT DOCUMENTS

| | | | |
|---|---|---|---|
| 1,832,660 | 11/1931 | Sadtler | 8/467 X |
| 3,414,368 | 12/1968 | Kitamura et al. | 8/456 |
| 3,922,445 | 11/1975 | Mizuno et al. | 428/914 X |

*Primary Examiner*—Thomas J. Herbert, Jr.

*Attorney, Agent, or Firm*—Kenyon & Kenyon

[57] ABSTRACT

A transfer sheet comprising, in laminated combination, a substrate sheet and, provided thereabove, a coloring layer of desired pattern containing a coloring agent possessing heat transferability and a resist layer of a desired pattern containing a metal compound for resist printing and a binder, the metal compound having the capability of causing the coloring layer to lose its heat transferability, either of the coloring layer and the resist layer being nearer than the other to the substrate sheet. Because of the capability of the metal compound, the resist power is very great, whereby ample resist printing effect can be obtained with only an extremely thin resist layer.

20 Claims, 18 Drawing Figures

TRANSFER SHEET WITH RESIST PORTIONS

CROSS-REFERENCES TO RELATED APPLICATIONS (IF ANY)

This is a division of application Ser. No. 117,798 filed on Feb. 1, 1980, now U.S. Pat. No. 4,271,224, which was a continuation of application Ser. No. 864,486 filed on Dec. 27, 1977 and subsequently abandoned.

BACKGROUND

This invention relates generally to transfer sheets having (print) resist portions for resist printing.

Heretofore, a great variety of processes have been developed and proposed for coloring shaped materials and products. One of these processes is the so-called sublimation or heat transfer process, which ordinarily comprises: preparing a transfer sheet by forming a desired pattern with a composition containing as its predominant constituent a coloring agent such as a disperse dye or an oil-soluble dye which is highly sublimable on a desired support sheet structure; superposing a base material to which the transfer is to be made on the pattern face of this transfer sheet, and heating the resulting structure thereby to cause the above mentioned coloring agent to undergo sublimation thereby to cause the desired pattern to be transferred or transposed onto the base material, and thereby to color this material.

It is possible for the above mentioned sublimation to be accompanied partly by melting and evaporation. When the term "sublimation" is used hereinafter, it is intended to include partial melting and evaporation. A highly advantageous feature of the above described process is that, in comparison with conventional textile printing processes, process steps such as the printing (impressing) step, the steaming step, and the washing step can be abbreviated or simplified and, moreover, coloring of materials can be carried out in a dry heating manner.

For accomplishing resist printing in the above described sublimation or heat transfer process, various processes have heretofore been proposed. For example, one proposed process comprises first forming a resist layer comprising a water repellent such as a silicone resin on a sheet of paper, then printing this sheet with an aqueous ink containing a sublimable dye thereby to prepare a transfer sheet, and carrying out resist printing with the use of this transfer sheet. In this process, however, since an aqueous ink is used, swelling and wrinkling of the paper easily occur during the printing, and registering in multicolor printing is difficult. Another problem is that the preparation of the water-repellent ink is difficult, and, while relatively good results can be obtained with line drawings, soiling easily occurs particularly in the case of a picture of wide area.

In another example of a resist printing process proposed heretofore, a binder through which the sublimated vapor of the sublimable dye will not easily permeate is used. In this process, however, since a binder which will not mutually act with the sublimable dye is used, the resist action is weak, whereby the desired resist effect cannot be obtained unless the resist ink layer containing the binder is made extremely thick. For this reason, the printing of the resist printing ink is limited to a process, such as screen process printing, which can be carried out with a thick ink layer. By the screen process printing, however, the resolving power is poor, whereby fine resist printing patterns cannot be obtained. Furthermore, since the ink layer is thick, the drying gives rise to a difficulty in the production process, and, consequently, this becomes a cause of blocking. Still another problem is that, when a thick resist printing ink layer is provided on the transfer sheet, the close adhesion between the transfer sheet and the article to which the pattern is being transferred becomes insufficient during heat transfer, and nonuniform coloring easily occurs.

In still another known resist printing process, a resist agent comprising a water-soluble paste such as carboxymethyl cellulose is provided on a sublimable transfer sheet. According to a further proposal, a substance such as activated carbon is added to the above mentioned resist agent thereby to increase still more the resist effect. However, since the above mentioned water-soluble paste functions merely to physically shield off the sublimated dye, the resist action is weak, and, therefore, the resist layer must be made extremely thick. In this process the printing of the resist printing ink is limited to screen process printing, and various problems are encountered similarly as in the case of the second process described above.

SUMMARY

With the aim of solving the various problems accompanying the prior art processes as described above, we have carried out studies, as a result of which we have arrived at this invention based on obtaining a resist effect by utilizing the action, with respect to a coloring agent having a transferability upon heating of a metal compound having the property of causing the coloring agent to lose its heat transferability.

According to this invention, briefly summarized, there is provided a transfer sheet with resist portions characterised in that it has, above a base or substrate sheet, a coloring layer of a desired pattern containing a coloring agent which possess heat transferability and a resist layer of a desired pattern containing a metal compound for resist printing and a binder, and in that the metal compound for resist printing has a property of causing the coloring agent to lose its heat transferability. Either of the coloring layer and the resist layer may be nearer than the other layer to the substrate sheet or may be interposed between, when the other layer is formed in two layers, the two layers.

The term "heat transfer" as used herein means the substantially effective transposition of a coloring agent upon heating thereof from the transfer sheet to a transfer receiving material. The mechanism of this heat transfer is due principally to a vapor-phase action (sublimation or evaporation), but the direct contacting of the transfer receiving material by the molten coloring agent, resulting in the transposition thereof without its passing through the vapor state, is also possible.

Since, in a transfer sheet with resist portions of this invention obtained in the above described manner, the metal compound for resist printing used therein has the property of being capable of causing the coloring agent having heat transferability to lose this transferability, the resist power is very great. Accordingly, ample resist effect can be obtained with only an extremely thin resist layer. For this reason, printing of the resist layer by the gravure printing process, which was impossible by methods known heretofore, becomes possible. As a result, the transfer sheet with resist portions of this invention has greatly improved pattern resolving power, production efficiency, quality of printed matter, and other features.

Thus, because the metal compound for resist printing (hereinafter referred to as "resist metal compound") has the capability of causing a heat transferable coloring agent to lose its heat transferability, a large number of advantages not found in the prior art processes can be obtained through the use of the transfer sheet of this invention. However, in the case where this resist metal compound has only the above stated property and exhibits no reaction whatsoever with the binder constituting the resist layer, since this metal compound is merely dispersed in the binder, the film formability of the resist layer is deficient in some cases. For this reason, cracks readily develop in the resist layer after drying of the solvent, and, when the transfer sheet is bent, the resist layer fractures or, at the time of heat transfer, easily peels off from the transfer sheet.

In order to overcome these problems, a compound which has the additional property of reacting with the binder constituting the resist layer to strengthen the film is used for the resist metal compound of the transfer sheet according to this invention in its preferable mode. By this expedient, the film forming characteristic of the resist layer is remarkably improved.

The nature, utility, and further features of this invention will be apparent from the following detailed description beginning with a consideration of the general aspects of the invention and concluding with specific examples of practice illustrating preferred embodiments of the invention.

Throughout the accompanying drawings like parts are designated by like reference numerals.

DETAILED DESCRIPTION

The term "portion" as used in the following description means a portion, not in the thickness direction of the transfer sheet, but in the planar direction, that is in a direction parallel to the surface of the transfer sheet.

Figure 1:
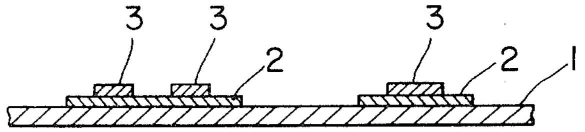
FIGS. 1 through 8 are all enlarged fragmentary views, in section perpendicular to the plane of the substrate sheet, and conceptually show various structural organizations of the transfer sheet with resist portions according to this invention.

First, FIG. 1 is a schematic view, in section, conceptually showing the most basic construction of the transfer sheet with resist portions of this invention. As shown in FIG. 1, this transfer sheet has a base or substrate sheet 1, on which a coloring layer 2 of any desired pattern containing a coloring agent possessing heat transferability is placed. On this coloring layer 2 is placed a resist layer 3 of any desired pattern containing a metal compound as a resist agent with respect to the above mentioned coloring agent (resist metal compound) and a binder. The coloring layer 2 can be provided in a monochrome or multichrome pattern in any desired manner over the total area or over a portion of the area of the substrate sheet 1. Furthermore, the resist layer 3 is provided on at least one portion of the coloring layer 2, and, depending on convenience such as that for the production process, it may have a portion thereof provided on the substrate sheet 1 at a portion thereof where the coloring layer does not exist, without any impairment of the effectiveness of this invention.

Figure 2:
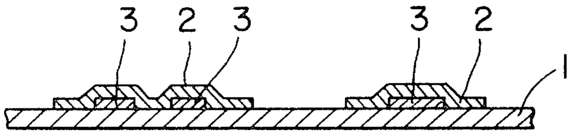

In another basic construction of the transfer sheet with resist portion as shown in FIG. 2, the relative positions of the coloring layer 2 and the resist layer 3 on the substrate sheet 1 shown in FIG. 1 are reversed. In this case, also, a resist effect similar to that of the construction illustrated in FIG. 1 can be attained. Therefore, the positional relationship between the coloring layer 2 and the resist layer 3 on the substrate sheet 1 can be selected at will. Particularly in the case where the binder contained in the coloring layer 2 and the binder contained in the resist layer 3 are mutually soluble, a similar effective result is obtained irrespective of the positional relationship between the coloring layer 2 and the resist layer 3. However, in the case where the two binders are not mutually soluble, it is desirable that the resist layer 3 be above the coloring layer 2 as shown in FIG. 1.

Next, in addition to the fundamental construction described above of the transfer sheet with resist portions of the invention, it is possible to provide, on the uppermost layer of the transfer sheet and/or at least one position between the coloring layer, the resist layer, and substrate sheet, a resin film which preferably does not transfer the above mentioned coloring agent at the time of non-heat transfer but effectively transmits the coloring agent at the time of heat transfer. This resin film will not interfere with the transfer of the coloring agent under heating and its principal object is to prevent, in the case where a plurality of transfer sheets with resist portions are stored in stacked state, contamination due to transposition of the coloring agent to the substrate sheet of another transfer sheet with resist portions.

Figure 3:
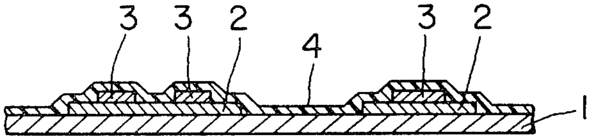
Figure 3:
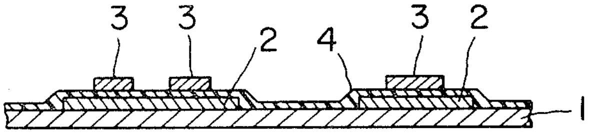
Figure 3:
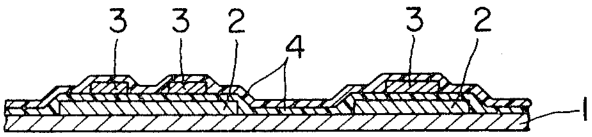
Figure 4:
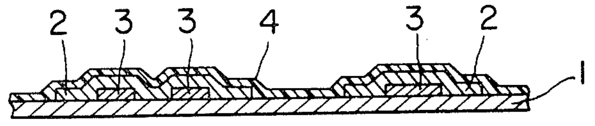
Figure 4:
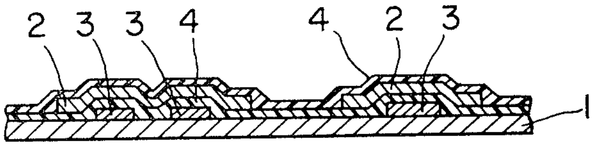

Several examples of transfer sheets with resist portions having the above mentioned resin film 4 are conceptually shown in the sectional views of FIGS. 3 and 4. FIGS. 3(*a*), 3(*b*), and 3(*c*) show examples of desirable construction in cases where at least one layer of the resin film 4 is provided in or on the transfer sheet with resist portions of the construction shown in FIG. 1. Similarly, FIGS. 4(*a*) and 4(*b*) illustrate examples of desirable construction in cases where at least one layer of the resin film 4 is provided in or on the transfer sheet with resist portions of the construction shown in FIG. 2.

The transfer sheet with resist portions of this invention having a construction as described above can accomplish colored resist printing by jointly using a separate heat transferable coloring agent (hereinafter referred to merely as "non-resist coloring agent") having the property of not losing its heat transferability even when it contacts a metal compound contained in the above mentioned resist layer 3, differing from the coloring agent having a heat transferability which is contained in the coloring layer 2. For this colored resist printing the transfer sheet with resist portions of this invention can assume various forms of construction.

Figure 5:
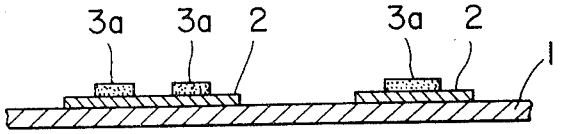
Figure 5:
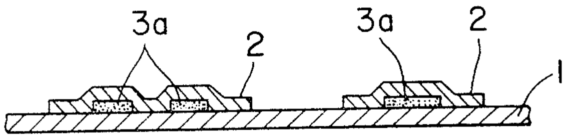

In one such construction, as shown in FIGS. 5(*a*) and 5(*b*), a resist layer 3*a* which is obtained by causing a non-resist coloring agent to be contained in a resist layer 3 is used. In this case, the structural organizations shown in FIGS. 5(*a*) and 5(*b*) correspond respectively to those shown in FIGS. 1 and 2. In either case, an ample colored resist printing effect is obtained.

Furthermore, structural arrangements wherein at least one layer of the above mentioned resin film 4 is added to either of the arrangements illustrated in FIGS. 5(*a*) and 5(*b*) are also possible. Such arrangements correspond respectively to those in FIGS. 3 and 4, but are not shown in the drawings. When a transfer sheet with resist portions of this type is used, the portions corresponding to the resist layer in the case of heat transfer are colored by only the non-resist coloring agent, and the coloring layer portions not corresponding to the resist layer are colored by only the coloring agent which loses heat transferability because of the metal compound for resist printing.

Figure 6:
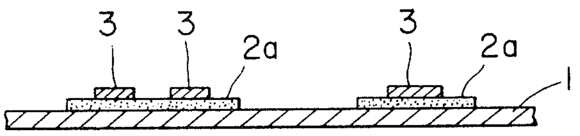
Figure 6:
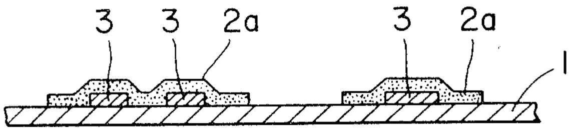

Furthermore, for carrying out colored resist printing by using a transfer sheet according to this invention, a method can be resorted to wherein a coloring layer 2*a*, as shown in FIGS. 6(*a*) and 6(*b*), which is obtained by causing the coloring layer 2 to contain a non-resist coloring agent, is used. In this case, the structural organizations shown in FIGS. 6(*a*) and 6(*b*) correspond respectively to those shown in FIGS. 1 and 2. In either case, ample colored resist printing effect is obtained. Additionally, at least one layer of the aforedescribed resin film can be added to each of the constructions illustrated in FIGS. 6(*a*) and 6(*b*). These arrangements respectively correspond to those illustrated in FIGS. 3 and 4 but are not shown in the drawings. When a transfer sheet of this type is used in the heat transfer, the portions corresponding to the resist layer are colored by only the non-resist coloring agent, while the coloring layer portions which do not correspond to the resist layer are colored with a mixed color of the coloring agent which loses its heat transferability because of the resist metal compound and the non-resist coloring agent.

Figure 7:
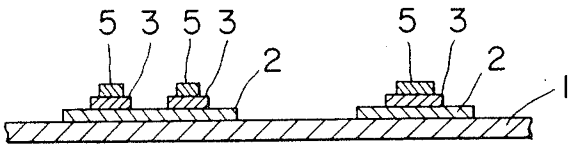
Figure 7:
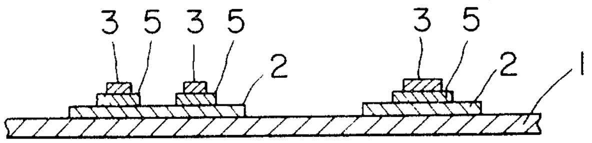
Figure 7:
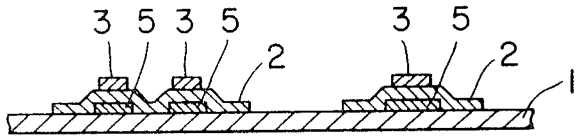
Figure 7:
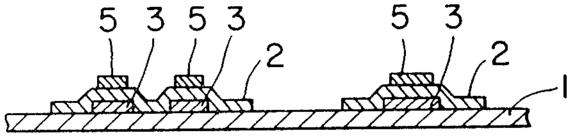
Figure 7:
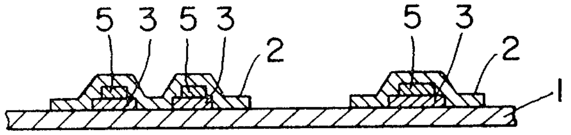
Figure 7:
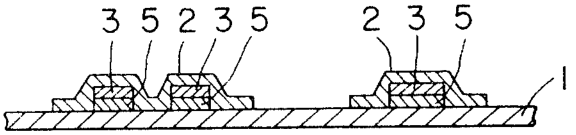

Still another method of carrying out the colored resist printing by using a transfer sheet of this invention comprises providing a non-resist coloring layer 5 containing a non-resist coloring agent on the substrate sheet 1 in addition to a coloring layer 2 and a resist layer 3 as shown in FIGS. 7(*a*) through 7(*f*). In this case, examples of arrangements wherein the non-resist coloring layer 5 is added to the construction illustrated in FIG. 1 are shown in FIGS. 7(*a*), 7(*b*) and 7(*c*). Similarly, examples of arrangements wherein the non-resist coloring layer 5 is added to the construction illustrated in FIG. 2 are shown in FIGS. 7(*d*), 7(*e*) and 7(*f*). In either case, ample colored resist printing effect is obtained.

Furthermore, it is possible to provide at least one layer of the aforedescribed resin film 4 on the uppermost layer or between any of the substrate sheet 1, the coloring layer 2, the resist layer 3, and the non-resist coloring layer 5 of the constructions illustrated in FIGS. 7(*a*) through 7(*f*), but such arrangements are not shown in the drawings. When a transfer sheet of this type is used in the heat transfer, if the resist layer and the non-resist coloring layer are provided in exactly coincident positions, the portions corresponding to the resist layer will be colored by only the non-resist coloring agent, while the coloring layer portions not corresponding to the resist layer will be colored by only the coloring agent which loses its heat transferability because of the resist metal compound.

In a transfer sheet with resist portions of this type, a great number of variations in addition to the above examples are conceivable. For example, when the non-resist coloring agent layer 5 is provided on only one portion of the resist layer 3, or the non-resist coloring agent is caused to be contained in only one portion of the resist layer 3 to form the resist layer 3*a*, in the heat transfer, the article subjected to the transfer can be divided into three different portions, namely, a portion colored by only the coloring agent having the property of losing its heat transferability because of the resist metal compound, a portion colored by only the non-resist coloring agent, and a portion which is not colored at all upon being subjected to the resist printing. With respect to a part of these variations, they are indicated in conjunction with the examples of layer arrangements in FIGS. 7(*a*) through 7(*f*).

Furthermore, in each of the arrangements shown in FIGS. 7(*a*) through 7(*f*), at least one portion of the coloring layer 2 or the resist layer 3 can be caused to contain the non-resist coloring agent to form the layer 2*a* or 3*a* as will be apparent from the foregoing description. In addition, it will also be apparent that, for multicolor printing, layers such as layers 2, 2*a*, 3*a*, and 5, themselves, can be of laminated construction (their unit layers not being required to be provided at the same portions). Examples of the coating quantities of the various layers of a transfer sheet of this invention on a dry basis are: coloring layer 2 or 2*a*, 0.01 to 40 grams/square meter (g/m$^2$); resist layer 3 or 3*a*, 0.05 to 70 g/m$^2$; resin layer 4, 0.2 to 4 g/m$^2$; and non-resist coloring layer 5, 0.01 to 110 g/m$^2$.

The various elemental materials of the above described transfer sheets with resist portions will now be described in greater detail.

For the base or substrate sheet 1 used in the transfer sheet with resist portions according to this invention, a material which will not undergo chemical change or physical change such as shrinkage, swelling, etc., as a result of the conditions such as those of forming the pattern or the resin film or the conditions such as those of the heat transfer is desirable. For example, various kinds of papers and synthetic papers, cellophane, films and sheet structures of various resins having heat resistance, various metal foils and thin sheets and the like, and lamination films and the like formed by laminating as desired these materials by an ordinary process can be used. In this connection, in the case where, for example, aluminum foil, a film or sheet article of a resin, a rubber sheet, glassine paper of high density, parchment paper of high density, and like materials are used for the substrate sheet as described above, it is not necessary in all cases to provide the aforementioned resin film on these substrate sheets.

The coloring agent which is caused by the resist metal compound to lose its heat transferability may be any agent provided that it loses substantially its heat transferability, for example, by forming a complex or a salt or by giving rise to a decomposition reaction upon being subjected to the action of the resist metal compound as described hereinafter and has heat transferability in the state where the resist metal compound does not act thereon. For this coloring agent various dyes may be used, such as disperse dyes, basic dyes, acidic dyes, and oil-soluble dyes.

Specific examples of these dyes are:

Celliton Yellow SF 7863 (C.I. Disperse Yellow 3 (11855)), Celliton Pink SF 7867 (C.I. Disperse Red 11 (62015)), Celliton Blue SF 7872 (C.I. Solvent Violet 13), Celliton Red SF 7874 (C.I. Disperse Red 60 (60725), Celliton Pink SF 7864 (C.I. Disperse Red 4 (60755), and Celliton Blue SF 7869 manufactured by BASF A.G.;

PTY-55 cC.I. Disperse Yellow 7 (26090), PTR-64, PTR-71 (C.I. Solvent Red 155), PTR-41, PTB-11, PTV-53 (C.I. Solvent Violet 32), PTB-67, PTB-77 (C.I. Solvent Blue 90), PTA-63, PTV-54 (C.I. Disperse Violet 56), PTV-56, PTR-54 (C.I. Disperse Red 147), PTV-52, Diaresin Orange G (C.I. Solvent Orange 68), Diaresin Brown A (C.I. Solvent Orange 72), Diaresin Red B, Diaresin Violet PVD (C.I. Solvent Violet 28 (61102)), Diaresin Red Z (C.I. Solvent Orange 71), Diaresin Blue N (C.I. Solvent Blue 94), and Diaresin Blue H5G (C.I. Solvent Blue 103) manufactured by Mitsubishi Kasei Kōgyō K.K.;

Kayaset Red 026, Kayaset Blue A.2R (C.I. Solvent Blue 83), Kayaset Yellow 919, Kayaset Orange 518, Kayaset Blue TDF, Kayaset Blue 972, Kayaset Blue 987 manufactured by Nihon Kayaku K.K.;

Sumiplast Red 301, Sumiplast Red FB (C.I. Solvent Red 146), Sumiplast Red B (C.I. Solvent Red 147), TS Yellow 106 (C.I. Disperse Yellow 60 (12712)), TS Red 306 (C.I. Disperse Red 191), TS Blue 601 (C.I. Disperse Blue 26 (63305)) and TS Turq. Blue 606 (C.I. Disperse Blue 60 manufactured by Sumitomo Kagaku Kōgyō K.K.;

Neoplast Yellow HR (C.I. Disperse Yellow 54), Neoplast Black MR, Neoplast Yellow HG, Neoplast Blue RB and Neoplast Blue RN manufactured by the Shin Nihon Kasei K.K.;

Subraprint Yellow 70001, Subraprint Red 70619, Subraprint Yellow 70601, Subraprint Yellow 70611, Subraprint Yellow 70004, Subraprint Yellow 70618, Subraprint Red 70623, Subraprint Navy Blue 70017, Subraprint Green 70018, and Subraprint Blue 70038 manufactured by the Holliday Company;

Dispersion Yellow VP 247 and Dispersion Blue VP 250 manufactured by Hoechst A.G.;

Transferon Yellow 2GN, Transferon Brilliant Blue E-GFLN, Transferon Blue 2RP, Fat Yellow 3GL, Transferon Brilliant Pink 5BP, and Transferon Brilliant Violet BLN manufactured by the Sandoz Company;

Dispersol Red B.3B (C.I. Disperse Red 11 (62015)), Dispersol Yellow C 5G (C.I. Disperse Yellow 119), and Dispersol Yellow A.G. (C.I. Disperse Yellow 1 (10345)) manufactured by the I.C.I. Company;

Mitsui PS Red G (C.I. Solvent Red 146), Mitsui PS Blue 3R (C.I. Solvent Violet 33), Mitsui PS Violet RC (C.I. Solvent Violet 31), Miketon Polyester Yellow GF (C.I. Disperse Yellow 8 (12690)), Miketon Polyester Violet BN (C.I. Disperse Violet 37), Miketon Polyester Yellow YL (C.I. Disperse Yellow 42 (10338)), Miketon Polyester pink BL (C.I. Disperse Red 55), Miketon Polyester Red 4BF (C.I. Disperse Red 207), and Miketon Polyester Yellow 5G (C.I. Disperse Yellow 5 (12790)) manufactured by Mitsui Tōatsu Kagaku K.K.;

Amasolve Yellow BG, Amasolve Yellow PF, Amasolve Red EB, Amasolve Blue BG, Amasolve Blue RL, Amasolve Violet R and Amasolve Violet B manufactured by the American Color Company;

Transfer Yellow FG manufactured by the Atlantic Company;

Plast Violet 8840 manufactured by Arimoto Kagaku K.K.; and

Catulia Blue 2J, Catulia Yellow 2J, Catulia Red B, Catulia Blue 2R, Catulia Violet R manufactured by the Francolor Company.

Of these dyes, PTY-55 manufactured by Mitsubishi Kasei Kōgyō K.K., Kayaset Red 026, Kayaset Blue A.2R, Kayaset Yellow 919, Kayaset Orange 518, and Kayaset Blue TDF, manufactured by the Nihon Kayaku K.K. and others are particularly desirable.

It is considered that a coloring agent reacts particularly with the metal in the resist metal compound to form a chelate ring, whereby its heat transferability is inhibited, and this tendency is observed frequently in disperse dyes and oil-soluble dyes. This chelate forming characteristic is observable in many dyes each having two or more groups possessing unshared electron pairs in their molecules such as —N═N—, —OH, —COOH, >C═0, and —$NH_2$, and, classified structurally, there are many dyes of good resist printability (i.e., good tendency of losing their heat transferability) among the anthraquinone dyes. It has been found that anthraquinone dyes each having an OH group at the α-position, particularly, have excellent resist printability (property of losing its heat transferability) with almost no exception. Examples among the above enumerated dyes whose structures have been confirmed are Celliton Blue SF 7872, Celliton Red SF 7874, and Celliton Pink SF 7864 manufactured by BASF A.G., TS Blue 601 manufactured by the Sumitomo Kagaku K.K., and Dispersol Blue G manufactured by the I.C.I. Company. On one hand, in the case of basic dyes, in addition to the above mentioned function of forming a chelate, bonding between the dyes and the resist metal compound can be effected as a result of the cationic characteristics of the dyes, themselves, without selectivity comparatively with various acidic substances and the like.

In this invention, it is desirable in the case where a dye of low heat transferability among the basic dyes, acidic dyes, oil-soluble dyes, and disperse dyes is used as the coloring agent to use jointly a heat transfer promoting agent having the property of being capable of increasing the heat transferability of this coloring agent. For this heat transfer promoting agent, oxidizing agents comprising various metal peroxides, peroxy acids, etc., bases such as those comprising hydroxides of alkali metals and alkaline earth metals or salts thereof with weak acids, and other compounds are used. More specifically, any of the oxidizing agents set forth in U.S. Pat. No. 3,922,445 or any of the bases set forth in German Patent Specification (Auslegesherift) No. 2,413,494 is used.

This heat transfer promoting agent can be used in a quantity of 1/10 to 20 mole equivalents relative to 1 mole equivalent of the coloring agent, but a quantity of 1 to 10 mole equivalents per mole equivalent of the coloring agent is especially preferable. This heat transfer promoting agent is highly effective particularly for basic dyes.

In the transfer sheet with resist portions according to the present invention, various additives and the like can be used in the coloring layer, depending on the necessity, in addition to the above described coloring agent. For example, when the coloring agent is transferred onto the substrate to be transferprinted, any of various additives and the like for adjusting the state of a composition containing a coloring assistant which permeates into the substrate and; causing swelling between micelles, has the effect of enhancing such characteristics as the permeability of the coloring agent or a binder, a coloring agent or a heat transfer promoting agent, etc., can be used.

For the above mentioned coloring assistant, for example, urea, naphthalene, ammonium tartrate oxalates of aliphatic amines such as cyclohexylamine, ammonium acetate, benzylamine, and various kinds of anionic, nonionic and ampholytic surfactants, etc. can be used. Furthermore, for the above mentioned additives, for example a plasticizer, stabilizer, wax grease, drying agent, auxiliary drying agent, hardener, emulsifier, thickener, filler, dispersant, and other additives can be used.

Examples of the metal compounds which are capable of acting on any of the above described coloring agents having heat transferability and causing them to lose their heat transferability, that is, the resist metal compounds in the transfer sheet with resist portions according to the present invention are: zine compounds such as zinc chloride and basic zinc carbonate; aluminum compounds such as aluminum tartrate and aluminum acetate; chromium compounds such as chromic acetate, chromous chloride, chromic chloride, chromic sulfate and chromium formate; cobalt compounds such as cobalt chloride, ammonium cobaltous sulfate and cobaltous oxalate; tin compounds such as tin acetate, stannic chloride, stannous chloride and stannous sulfate; iron compounds such as ferric chloride, ferric nitrate, ferric oxalate, potassium iron oxalate, ferrous chloride and ferrous sulfate; copper compounds such as cuprous chloride, cupric chloride, copper oxalate, copper formate, copper acetate, basic copper acetate and cupric carbonate; nickel compounds such as nickel chloride, nickel formate, nickel acetate, nickelous carbonate, nickelous nitrate and nickel oxalate; barium compounds such as barium acetate, barium carbonate and barium chloride; sodium compounds such as sodium molybdate and sodium phosphomolybdate; and metallic compounds hereinafter described which also have a property of reacting with the binder in the resist layer to strengthen the resist layer film.

Of the above enumerated metal compounds, compounds each containing one metal from among chromium, iron, copper, nickel, and cobalt and, moreover, having a radical from among a hydrochloric acid radical, a sulfuric acid radical, an acetic acid radical, an oxalic acid radical, and a formic acid radical have a high resist effect and are particularly desirable materials as resist agents solely from the standpoint of the resist effect. This effectiveness is pronounced particularly for disperse dyes and oil-soluble dyes.

Alternatively, for the resist agent, inorganic acids such as molybdic acid, tungstic acid, and vanadic acid and salts thereof, for example, can be used. These compounds are particularly effective for basic dyes.

For the resist metal compound in the transfer sheet with resist portions according to the present invention, metal compounds which act on the coloring agent having the above mentioned heat transferability and thereby have the effect of causing the coloring agent to lose its heat transferability, that is, a resist effect, and which, in addition, have the property of exhibiting mutual effects such as a cross-linking effect a polymerization catalytic effect, an ester-exchange catalytic effect, and a hardening promoting effect with the binder constituting the resist layer thereby to strengthen the film are particularly desirable.

For this film strengthening effect, a cross-linking reaction of a binder with a metal compound as a cross-linking agent is thought to be particularly effective. In addition, polymerization of the metal compounds themselves and condensation polymerization reaction due to hydrolysis also contribute to this film strengthening. A resist metal compound having additionally this film strengthening effect comprises a single compound or a mixture of two or more compounds selected from metal alkoxides, metal carboxylates, and metal chelates.

For the above mentioned resist metal compound, a compound which is active and particularly preferably has the possibility of cross-linking of a binder resin is used. Examples of desirable compounds which are applicable are ester catalysts, aldol catalysts, polymerization catalysts, resin cross-linking agents, agents for improving adhesiveness, and metal oxide starting materials of high purity. Specific examples of metal in these resist metal compounds are, preferably, vanadium titanium, silicon, aluminum, chromium, iron, cobalt, copper, magnesium, zirconium, and nickel.

In addition, as a group to be bonded with the metal to form the metal compound, a carboxyl or an acyl group of an aliphatic alcohol, an aromatic alcohol or the like for the alkoxide, a ligand comprising a $\beta$-diketone such as acetylacetone and a derivative thereof for the chelate, or an aliphatic or aromatic carboxylic acid, especially an aliphatic carboxylic acid for the metal carboxylate, is preferably used. For the resist metal compound according to this invention, a compound which contains two or more of the above named groups as, for example, a compound comprising a metal and an acyl group and a chelate-formable ligand bonded together to the metal, is also preferably used.

For determining whether or not a specific resist metal compound has a film strengthening effect as described above, it is convenient to make this determination from the improvement of the solvent resistance of the film in the following manner, for example. On a polyester film of known weight, a film of a dry film thickness of 20 microns and uniform composition comprising a binder resin (e.g., ethylcellulose) and the metal compound in a weight ratio of 1:3 is formed, and, after the sample compound has been immersed for 10 minutes in n-butanol at 25° C., it is dried. The elution rate is determined from the reduction in weight. Similarly, the elution rate of the film of the resin by itself is measured, and, if the reduction in elution ratio relative to the sole resinfilm is more than 5 percent, preferably 10 percent, it can be judged that the film has been strengthened by the addition of the metal compound. Furthermore, this film strengthening effect of the metal compound is determined by the combination with the binder resin, but whether or not this film strengthening effect can be attained with respect to a specific resin can be determined by carrying out the above described determination with the use of, for example, tetrapropoxytitanium as the resist metal compound. It has been found that the above mentioned improvement of solvent resistance has a good correlation with improvement in the bending resistance and wear resistance of the film.

Specific examples of the resist metal compounds selected in this manner are: vanadium compounds such as n-propoxyvanadium, isopropoxyvanadium, n-butoxy vanadium and vanadium n-butyrate; zirconium compounds such as propoxyzirconium, n-butoxyzirconium, and butoxyzirconium ethylacetoacetate; titanium compounds such as methoxytitanium, ethoxytitanium, n-propoxytitanium, isopropoxytitanium, n-butoxytitanium, n-butoxytitanium polymer, stearyl titanate, 2-ethylhexyl titanate, nonyl titanate, cetyl titanate, triethanolamine titanate, isopropylhexylene glycol titanate, tributyloleyl orthotitanate, titanium lactate and titanium octyleneglycolate; silicon compounds such as methyl silicate and ethyl silicate; aluminum compounds such as aluminum ethylacetoacetate, n-butoxyaluminum, isopropoxyaluminum, 2-ethylhexaoxyluminum and 2-ethylhexaoxyaluminum isopropoxide; and metal acetylacetonates such as aluminum acetylacetonate, vanadium acetylacetonate, n-butoxyzirconium acetylacetonate, titanium acetylacetonate, chromium (III) acetylacetonate, iron (III) acetylacetonate, cobalt (II) acetylacetonate, copper (II) acetylacetonate, magnesium acetylacetonate, manganese (II) acetylacetonate, nickel (II) acetylacetonate and nickel (III) acetylacetonate.

This resist metal compound is used, with respect to the portion where the coloring layer 2 and the resist layer 3 overlap, in a quantity of 0.1 to 10 moles, preferably 0.5 to 2 moles for 1 mole of the coloring agent to be resisted.

The coloring layer and the resist layer basically constituting the transfer sheet with resist portions of this invention are respectively formed on the aforedescribed substrate sheet by using an ink or a paint composition containing a coloring agent possessing the above mentioned heat transferability, a binder, and a solvent or a dispersion medium and by using an ink or paint composition containing the above described resist metal compound, a binder, and a solvent or a dispersion medium. By forming at will a monochrome or multicolor pattern such as, for example, characters, signals, and pictures by an ordinary process such as a printing process, drawing process, or a painting process, a coloring layer or any desired pattern can be provided on the substrate sheet. In addition, a resist layer is similarly provided. The sequence in which these two layers are formed can be selected as desired as mentioned hereinbefore.

In the case where the above described heat transfer promoting agent is used jointly with the coloring agent which is caused to lose its heat transferability by the action of the resist metal compound, the coloring agent can be caused to be contained within the ink or the paint composition. Alternatively, by using an ink or paint composition containing predominantly the binder and the coloring agent to form beforehand any desired monochrome or multicolor pattern by an ordinary printing process, drawing process, or painting process similarly as described above and then applying a composition containing predominantly the heat transfer promoting agent, a coloring layer of the desired pattern can be formed.

Another procedure comprises applying beforehand a composition containing the coloring agent as the predominent constituent on any desired substrate sheet by the same process as described above but in reverse order and forming thereon a desired monochrome or multicolor pattern with an ink or a paint composition containing predominantly the binder and the heat transfer promoting agent thereby to form a coloring layer of any desired pattern on the substrate sheet.

Still another procedure comprises treating beforehand the coloring agent with a composition containing predominantly the heat transfer promoting agent, then, by using an ink or paint composition containing predominantly the coloring agent thus treated and the binder, forming a desired monochrome or multicolor pattern on any substrate sheet by an ordinary printing, drawing, or painting process similarly as described hereinabove thereby to form a coloring layer of the desired pattern on the substrate sheet.

Specific examples of binders suitable for use in forming the coloring layer, the resist layer and the non-resist coloring layer in the above described processes are: cellulose derivatives such as methyl cellulose, hydroxyethyl cellulose, ethyl cellulose, cellulose acetate propionate, cellulose acetate butyrate, nitrocellulose, ethyl hydroxyethyl cellulose, carboxymethyl cellulose, hydroxypropyl cellulose, cellulose acetate butyrate, cellulose acetate, and sodium alginate and its derivatives; polyvinyl alcohol, polyvinyl acetate, butyral resin, styrene resin, polycarbonate resins, polyester resins, polyamide resins, phenolic resins, aminoplasts, petroleum resins and rosin esters; homopolymers and copolymers of ethylenically unsaturated monomers such as unsaturated carboxylic acids such as acrylic acid, methacrylic acid, itaconic acid, fumaric acid and maleic acid, and their esters, acid amides and corresponding nitriles, and vinyl chloride, vinylidene chloride, vinyl acetate, styrene, vinylpyrrolidone, vinyl methyl ether, butadiene, ethylene and propylene; natural resin-modified phenolic resin, maleic acid resin, pentaerythritol resin, fumaric acid resin, phenolic resin, lime resin, alkyd resins, starch, gum arabic, tragacanth gum and gelatin.

The binder is ordinarily used in a quantity which is 5 to 99 percent by weight of the resist layer, the coloring layer, and the non-resist coloring layer. The remainder comprises the coloring agent or the resist metal compound and an additive used when necessary as described hereinafter. The above described binder may comprise jointly two or more kinds of binders when deemed necessary upon consideration of such factors as printability and ink characteristics.

For the binder as described above in this invention, a binder which softens or melts when subjected to conditions such as the heating temperature of the heat transfer conditions is not desirable. A binder which thus softens or melts is transferred, itself, onto the material being printed at the time of heat transfer and is undesirable since in some cases it produces transferred products which are inferior in properties such as hand.

It is necessary to appropriately select the kind and quantity of the binder which is a constituent of the resist layer 3 or 3*a* so that the binder will not rapidly react with the resist metal compound and undergo gelation at the time of preparing an ink or a paint composition. The use of cellulose binders such as ethyl cellulose, cellulose acetate propionate, cellulose acetate butyrate, and nitrocellulose, vinyl binders such as a butyral resin, acryl binders such as polymethylmethacrylate, and styrene binders is particularly desirable.

While the quantity of the resin used differs with the kind of resin, it is preferably 5 to 12 percent in the case of a cellulose resin such as ethyl cellulose in an ink composition having a relatively large number of OH groups, for example and is preferably 5 to 20 percent in the case of a styrene resin which does not have an OH group. The reaction of the resin of the binder constituting the resist layer and the resist metal compound can take many forms as was mentioned hereinbefore, but a resin having a hydroxide group, such as a cellulose resin, a polyvinylalcohol, a polyvinylacetal, etc., is particularly desirable since it has the property of reacting with the resist metal compound having a film strengthening effect and undergoing cross-linking and forms a strong film. A resin containing such a hydroxide group is considered to give rise to a dealcohol reaction as indicated, for example, by the following formula with a metal alkoxide, and the cross-linking reaction progresses.

$$\begin{matrix} -OH & & HO- \\ -OH & M^{IV}(OR)_4 & HO- \\ -OH & & HO- \end{matrix} \longrightarrow$$

-continued

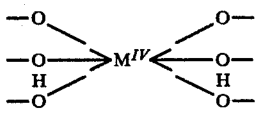

+ 4ROH

As a result of this, the film properties of the resist layer are improved.

For the aforementioned solvent or dispersion medium any polar or nonpolar liquid can be used. Ordinarily water or an ordinary volatile organic solvent is used. The composition containing the coloring agent which loses its heat transferability because of the resist metal compound and the composition containing the resist metal compound may be in the state of a solution, an emulsion, a suspension, or a sol. Additives can be appropriately added to these compositions in order to adjust their states. Examples of such additives are plasticizers, stabilizers, waxes, greases, drying agents, auxiliary drying agents, hardening agents, emulsifiers, thickeners, fillers, dispersants, gelling agents, pH adjusting agents, defoaming agents, and activators.

Among the resist metal compounds used in this invention, there are some which react with the above mentioned various additives to contribute to improvement of film properties.

Furthermore, it is also possible to use the above described coloring agent and resist metal compound or the heat transfer promoting agent by microcapsulating the same. As a microcapsulating agent, a thin-film forming, organic resin used as a binder as described above can be used. Each capsule thus obtained must be destroyed under the heat transfer conditions set forth hereinafter, and, for this reason, an organic resin which is softened or decomposed under the transfer temperature conditions is desirable. Furthermore, the destruction of the capsules is caused or is promoted also by the application of a transfer pressure.

It is desirable that the particle size of the capsules be 3 to 60 microns and that the film thickness be less than 30 microns, particularly 1 to 10 microns. In addition, in using of the above mentioned agents as microcapsules, it is necessary to select a solvent or a dispersion medium which does not have a mutual solubility with the encapsulating agent.

Next, the film 4 of a resin which does not pass the coloring agent at the time of transfer without heating but does pass the coloring agent at the time of heat transfer, which film 4 is formed in the transfer sheet of the invention will be considered. Examples of resins which can be used for this film 4 are: natural or semisynthetic high-polymers including proteins, starches, cellulose derivatives and gums such as milk casein, soybean protein, yeast protein, bacteria protein, gelatin, green starch, dextrin, α-starch, oxidized starch, esterified starch, etherified starch, cationic starch, methyl cellulose, ethyl cellulose, carboxymethyl cellulose, hydroxyethyl cellulose, nitrocellulose, sodium alginate and gum arabic; polyvinyl alcohol, polystyrene, styren/maleic anhydride copolymer, olefin/maleic anhydride copolymer, methylmethacrylate/butadiene copolymer, acidified styrene/butadiene copolymer, acrylic ester resins, polyvinyl methyl ether, urea resin, polyolefins, polysodium acrylate, maple gum, polyvinyl pyrrolidone, vinyl methyl ether/acrylic acid copolymer, water-soluble thermosetting acrylic resins, rosin-modified maleic acid resin, ester gum, rosin-modified phenolic resin, xylene resin, polyacrylates, butyral resin and epoxy resins.

Figure 8:
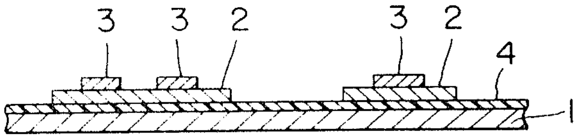

The resin film 4 can be applied by a suitable ordinary method such as the gravure coating method, coating by means of a coating machine, the silk screen method, the air knife method, and the spraying method. The quantity of application, while differing with the resin, is preferably from 0.2 $g/m^2$ to 4 $g/m^2$ (dry basis). In the case where the above described resin film is provided directly above the substrate sheet 1 and is used particularly as an anchoring agent for preventing sublimation of the dye during preservation of the transfer sheet (an example corresponding to FIG. 1 is shown in FIG. 8), resins which are particularly desirable among those enumerated above are those of low adsorptivity with respect to sublimable dyes such as proteins, starches, cellulose-derivatives, gums, polyvinyl alcohol, styrene/maleic anhydride copolymer and oleffin/maleic anhydride copolymers.

In this invention, furthermore, in the case where the resin film 4 is provided at a position other than directly above the substrate sheet 1, any of various kinds of resins can be used if its only purpose is to prevent contamination. However, since an object of this invention is to transpose faithfully a picture by transferring, the resin layer provided as the uppermost layer not only must prevent contamination but also at the same time must not impair the transferability. In view of this consideration, it is preferable to use, from among the above considered resins, resins such as water-soluble resins including polyvinyl alcohol, polysodium acrylate and polyvinyl pyrrolidone, and oil-soluble resins including xylene resin, rosin-modified phenolic resin, polyvinyl butyral, epoxy resins, polystyrene and petroleum resin.

The effectiveness of the resin film is high particularly when it is provided as the uppermost layer of the transfer sheet.

Furthermore, in the practice of this invention, a pigment, dispersing agent, deforming agent, water-proofing agent, pH-adjusting agent, antiseptics, viscosity-adjusting agent, and other additives can be appropriately added to the resin layer or into the coating liquid thereof in order to improve the coating properties such as resistance to curling of paper, fluidity of the coating liquid, absence of foam, etc. Examples of suitable pigments are kaolin, clay, aluminum hydroxide, talc, titanium dioxide, zinc oxide, calcium carbonate, calcium sulfate, barium sulfate and colloidal silica. The addition of these additives is highly effective particularly in the case where the resin film is used for the above mentioned anchor coating treatment.

The forming of the film of the above described resin according to this invention is not limited to application by a painting or coating method but may be accomplished by forming the resin into a film or sheet by an ordinary process and then laminating this film or sheet by a known method.

For the non-resist coloring agent used for colored resist printing through the use of the transfer sheet of this invention, any material having the property of not losing substantially its heat transferability as a result of the effect of the aforementioned resist metal compound can be used. More specifically, it may be considered that the facility with which a complex of the resist metal compound can be formed is determined by conditions such as the structure of the coloring agent and factors of external environment such as the pH and the additives.

With respect to a certain resist metal compound, coloring agents which can and others which cannot be used for resist printing appear. For these non-resist coloring agents, various dyes such as disperse dyes, basic dyes, acidic dyes, and oil-soluble dyes from which the above mentioned dyes capable of resist printing have been excluded can be used. Specific examples of such suitable dyes are:

Celliton Yellow SF 7861 (C.I. Disperse Yellow 13 (58900)), Celliton Yellow SF 7862, Celliton Scarlet SF 7865 (C.I. Disperse Red 1 (11110)), Celliton Rubine SF 7866 (C.I. Disperse Red (11115)), Celliton Red Violet SF 7868 (C.I. Disperse Violet 1 (61100)) manufactured by BASF A.G.;

PTR-51 (C.I. Disperse Red 50), PTY-51 (C.I. Disperse Yellow 71), PTW-53 (C.I. Disperse Brown 17), PTY-52 (C.I. Disperse Yellow 141), PTY-59 (C.I. Solvent Yellow 114), Diaresin Red S, Diaresin Blue K (C.I. Solvent Blue 92) manufactured by Mitsubishi Kasei Kōgyō K.K.;

Kayaset Scarlet 956, Kayeset Orange AN(C.I. Solvent Orange 67), Kayaset Yellow A.G., Kayaset Brown 939 manufactured by Nihon Kayaku K.K.;

Sumiplast Red AS (C.I. Solvent Red 143), Sumiplast Orange HRP (C.I. Solvent Orange 60), Sumiplast Yellow 102 (C.I. Disperse Yellow 51), TS Yellow 111 manufactured by Sumitomo Kagaku Kōgyō K.K.;

Subaprint Orange 70020, Subraprint Orange 70007 (C.I. Disperse Orange 3 (11005)), Subraprint Orange 70006 (C.I. Disperse Orange 1 (11080)), Subraprint Orange 70025, Subraprint Brown 70023 manufactured by the Holliday Company;

Dispersion Red VP 249, Hostasol Red 5B (C.I. Vat Red 41 (73300)) manufactured by the Hoechst A.G,;

Transferon Brilliant Orange E-RLK, Transferon Brilliant Yellow 6GFL, Transferon Brilliant Yellow E3GFL manufactured by the Sandoz Company;

Dispersol Orange B.2R (C.I. Disperse Orange 25), Dispersol Blue G (C.I. Disperse Blue 26 (63005)) manufactured by the I.C.I. Company;

Mitsui PS Red GG (C.I. Solvent Red 111 (60505)), Miketon Polyester Brilliant Pink F5B, Miketon Polyester Fast Brown 3R manufactured by Mitsui Tōatsu Kagaku K.K.;

Amasolve Yellow C, Amasolve Orange 3R manufactured by the American Color Company;

Transfer Blue 2N manufactured by the Atlantic Company;

Plast Red 8320, Plast Red 8350 manufactured by the Arimoto Kagaku K.K.; and

Oplas Yellow 136 manufactured by the Orient Company.

Of these days, particularly preferable non-resist coloring agents are: PTY-51 manufactured by the Mitsubishi Kasei Kōgyō K.K.; Subraprint Orange 70020, and Subraprint Orange 70025 manufactured by the Holliday Company; Hostasol Red 5B manufactured by Hoechst A.G.; and Plast Red 8320 and Plast Red 8350 manufactured by Arimoto Kagaku K.K.

With regard to the above mentioned non-resist coloring agent, also, joint use of a heat transfer promoting agent, joint use of a coloring assistant, encapsulation, and other procedures as described hereinbefore are applicable. This non-resist coloring agent can be used by adding it to the ink or paint composition used in forming the aforementioned coloring layer or the resist layer. In addition, it is also possible to knead this non-resist coloring agent, itself, together with a binder and a solvent or a dispersion medium thereby to prepare an ink or a paint composition and to form an independent non-resist coloring layer. In this case, for the binder and the solvent or the dispersion medium, those mentioned hereinbefore can be suitably used.

Next, the process of carrying out heat transfer printing by using the transfer sheet with resist portions according to this invention will be described. First, in accordance with this invention, the transfer sheet as described hereinabove and the base material to receive the transfer pattern (article to be transferprinted) are mutually superposed so that the surface provided with the coloring layer of the former contacts the surface of the latter. The superposed sheet and material are then subjected to the heat transfer printing comprising heating and pressing the same by means such as a heating press plate or by passing the same around a heating drum while applying a pressure with a felt belt. Thereafter, the transfer sheet is stripped off, whereupon the coloring agent in the desired pattern on the transfer sheet is transferred onto the transfer receiving base material, whereby a transfer-printed product having a very clear color tone and, moreover, having ample durability is obtained.

In the heat transfer process as described above, the heating temperature need not exceed the melting point or the sublimation point of the coloring agent, itself, which is used for fabricating the transfer sheet and, while this temperature differs with factors such as the kind of coloring agent, is preferably selected from the range of approximately 80° C. to 250° C.

In the above described process, the pressing pressure is preferably from approximately 50 g/cm$^2$ to approximately 20 kg/cm$^2$.

The duration of the heating and pressing treatment is preferably from approximately 5 seconds to approximately 90 seconds.

For the base material to receive the transferred pattern in the heat transfer process as described above, a wide variety of materials can be used. Examples of materials which can be advantageously used are: sheet-form fiber materials such as woven materials of fibers such as plant fibers such as cotton and linen, animal fibers such as sheep wool and silk, glass fibers, fibers such as rayon, acetate, and staple fiber, fibers such as synthetic fibers of various kinds such as polyamides, polyesters, polyacrylonitriles, polyvinyl chlorides, polyvinyl alcohols, and mix-spun yarns of two or more of these fibers; films or sheets of various synthetic resins; various papers; foils and sheets of various metals; glass sheets; ceramics; leather-like materials such as animal leathers, collagens, and synthetic leathers; sheets and formed articles of rubber; wood materials; plywoods and veneers; slate plates; so-called hardboards; particle boards; plaster boards; and composite materials of organic compounds and inorganic compounds.

In addition, after the desired pattern has been transferred onto the transfer receiving material in the practice of this invention, the transfer receiving material can be subjected to steaming treatment or acid steaming treatment depending on the necessity.

In accordance with this invention, as is apparent from the foregoing description, resist printing is accomplished by utilizing the phenomenon whereby the coloring agent having heat transferability loses its heat transferability because of the effect of the resist metal compound. For this reason, the resist printing effectiveness is very high. Furthermore, in the case where a resist metal compound having additionally a property of reacting with the binder constituting the resist layer thereby to strengthen the film is used, the film characteristics of the resist layer and, in turn, those of the entire coating film during use and at the time of preservation are remarkably improved. Furthermore, not only a full white resist effect but, by using jointly a non-resist coloring agent which does not lose its heat transferability due to the above described metal compound, a colored resist printing effect wherein the resisted pattern is colored with the non-resist coloring agent, also, can be obtained in an extremely easy and clear manner.

Since the transfer sheet with resist portions of this invention has a great resist effect, it is not necessary to make the resist layer thick by a method such as screen process printing as in the prior art, and this transfer sheet can be provided with the resist layer by a printing process of good resolving power such as gravure printing and makes possible resist printing of extremely fine patterns. Accordingly, the greatest advantageous feature of the transfer sheet of this invention is that it affords the creation of resist patterns and, moreover, colored resist patterns which could not be realized in the prior art.

A further advantage of the present invention is that the entire printing process can be operated at a substantially single step, even if multiple steps can be adopted according to necessity under a perfectly dry condition without necessitating water or an organic solvent for solving or dispersing a coloring agent as is used in the conventional wet resist printing process.

In order to indicate more fully the nature and utility of this invention, the following specific examples of practice constituting preferred embodiments of the invention are set forth, it being understood that these examples are presented as illustrative only and not intended to limit the scope of the invention. Throughout these examples, quantities expressed in "parts" are "parts by weight".

EXAMPLE 1

100 parts of PTB-77 (an oil-soluble dye manufactured by Mitsubishi Kasei Kōgyō K.K., C.I. Solvent Blue 90), 70 parts of ethyl cellulose (EC-N7CP, manufactured by Hercules Company), 500 parts of xylene, and 330 parts of isopropyl alcohol were kneaded for a day in a porcelain ball mill pot to prepare an ink composition. This ink composition was applied on a gravure paper by the gravure process to obtain a printed sheet printed with a desired pattern. Subsequently, 200 parts of $CoCl_2$, 10 parts of polyvinyl alcohol (Gosenol GL-05, manufactured by Nihon Gosei Kagaku Kogyo K.K.), and 790 parts of water were kneaded for a day in a porcelain ball mill to prepare a resist ink composition. This resist ink was applied with a desired pattern on a part of a dye layer of the printed sheet to print the layer, whereby a transfer sheet for dry process with resisted portions was obtained. The sheet thus obtained was superposed on cloth of a polyester fiber so that the printed surface might be in contact with the cloth, and both were heated from the side of the sheet for 1 minute with an iron heated to 180° C. By peeling off the sheet from the cloth, transfer-printed cloth wherein the portion corresponding to that of the transfer sheet printed with a pattern with the resist ink was resisted with white color (in other words, was not printed and remained white) against the blue pattern was obtained.

EXAMPLE 2

250 parts of $NiCl_2$, 70 parts of methyl cellulose (Metorose 65 SH 50, manufactured by Daiichi Kōgyo Seiyaku K.K.), and 680 parts of water were kneaded in a sand mill for 2 hours to prepare a resist ink composition. This ink composition was applied on a coated paper by the screen process whereupon a floral pattern in thin lines was obtained.

Separately, 80 parts of ethyl hydroxyethyl cellulose (EHEC-Low, manufactured by Hercules Company), 120 parts of Kayaset Red-B (C.I. Solvent Red 146, an oil-soluble dye manufactured by Nihon Kayaku K.K.), 300 parts of n-butyl acetate, and 500 parts of n-butanol were kneaded in a sand mill for 1 hour to prepare a dye ink composition. This ink was applied by the gravure press over the entire surface of the coated paper with the floral pattern, whereupon a transfer sheet was obtained. The sheet thus obtained was used for heat transfer in the same manner as in Example 1, whereby transfer printed cloth wherein the floral pattern drawn in thin lines was clearly resisted with white color against a red ground was obtained.

EXAMPLE 3

120 parts of PTV-57 (C.I. Solvent Violet 31, manufactured by Mitsubishi Kasei Kōgyō K.K.) 80 parts of ethyl cellulose (EC-N7CP, manufactured by Hercules Company), 480 parts of xylene, 160 parts of n-butyl acetate, and 160 parts of n-butanol were kneaded for a day in a ball mill to prepare a purple ink composition. This ink was printed by the gravure process over the entire surface of a paper treated with a water-soluble resin, whereupon a printed sheet was obtained.

Subsequently, 400 parts of copper acetate, 30 parts of ethyl cellulose (EC-N7CP, manufactured by Hercules Company), 50 parts of rosin-modified maleic acid resin, 20 parts of micro silica, 300 parts of xylene, and 200 parts of n-butanol were kneaded in a ball mill for two days to prepare a resist ink composition.

The printed sheet was printed with this resist ink by the gravure process with a patterned printing plating having a cell depth of 60μ, whereby a sheet printed with the resist ink was obtained.

Then, 70 parts of polyvinyl alcohol (Gosenol GL-05, manufactured by Nihon Gosei Kagaku Kōgyō K.K.), 5 parts of octyl alcohol, and 10 parts of n-butanol were dissolved by agitation in a stirrer to prepare a liquid resin composition.

The entire surface of the sheet printed with the resist ink was coated with this resin composition by the gravure process and dried, whereby a transfer sheet was obtained.

This transfer sheet was superposed on cloth of a polyester fiber over a known continuous heat transfer machine, and, under the transfer conditions of 210° C. and 20 seconds, a transfer-printed cloth was obtained. As a result, only the lines printed with the resist ink were found to be clearly resisted.

EXAMPLE 4

350 parts of copper sulfate, 50 parts of Sumiplast Yellow 102 (manufactured by Sumitomo Kagaku Kōgyō K.K., C.I. Disperse Yellow 51), 70 parts of ethyl cellulose (EC-N4CP, manufactured by Hercules Company), 10 parts of micro silica, 250 parts of n-butyl acetate, and 280 parts of n-butanol were kneaded in a ball mill for 3 days to prepare a colored resist ink.

Subsequently, 90 parts of Sumikaron Turquoise Blue-S-GL (C.I. Disperse Blue 60, a disperse dye manufactured by Sumitomo Kagaku Kogyo K.K.), 100 parts of cellulose acetate butyrate, 300 parts of n-butyl acetate, and 210 parts of isopropyl alcohol were kneaded for a day in a ball mill to prepare an ink composition. A glassine paper as a substrate sheet was first printed with this ink composition by the screen process, and then printed with the colored resist ink composition by the gravure process to form polka dots, whereby a transfer sheet was obtained.

This transfer sheet was superposed on cotton cloth so that the printed surface thereof might be in contact with the cloth, and subjected to a transfer operation with a continuous transfer printing machine at 215° C. for 25 seconds. As a result, transfer-printed cloth with clear yellow polka dots on a blue ground was obtained.

EXAMPLE 5

60 parts of Miketon Polyester Yellow 5G (C.I. Disperse Yellow 5, manufactured by Mitsui Toatsu Kagaku K.K.), 100 parts of polyvinyl butyral (Eslec BL-1, manufactured by Sekisui Kagaku K.K.), 15 parts of Monopol 110G (manufactured by Kenseido Kagaku Kōgyō K.K.), 500 parts of n-butyl acetate, and 325 parts of n-butanol were kneaded in a ball mill for two days to prepare a yellow ink composition.

Separately, a blue ink composition was prepared in the same manner except that Sumikaron Blue-E-BR (C.I. Disperse Blue 26, a disperse dye manufactured by Sumitomo Kagaku Kōgyō K.K.) was used in place of the Miketon Polyester Yellow 5G in the above ink composition.

Then, 400 parts of nickel acetate, 50 parts of Miketon Polyester Brilliant Pink FFB (manufactured by Mitsui Toatsu Kagaku K.K., C.I. Vat Red 41), 40 parts of ethyl hydroxyethyl cellulose (EHEC-EL, manufactured by Hercules Company), 30 parts of a rosin-modified phenolic resin, 350 parts of xylene, 65 parts of n-butyl acetate, and 65 parts of n-butanol were kneaded in a ball mill for 3 days to prepare a resist ink composition.

A parchment paper as a substrate sheet was first printed with a pattern in thin lines with the colored resist ink by the gravure process. The sheet was further printed with the yellow ink composition by the gravure process, and then with the blue ink composition by the gravure process so that the blue ink might partly cover the pattern of yellow color, whereby a transfer sheet of yellow, blue and green colors was obtained.

This transfer sheet was superposed on cloth of a polyacrylonitrile fiber so that the coated surface thereof might be in contact with the cloth, and subjected to heat transfer with a flat-bed heat presser at 195° C. for 30 seconds. Consequently, transfer-printed acrylic fiber cloth wherein the pattern in thin pink lines was clearly resisted in other words, the pattern was printed with only the pink dye and not with the yellow nor blue dyes due to the resist effect against a ground of yellow, blue and green colors was obtained.

EXAMPLE 6

80 parts of Aizen Basic Cyanine 6GH (C.I. 42025, manufactured by Hodogaya Kagaku K.K.) 70 parts of ethyl hydroxyethyl cellulose (EHEC-L, manufactured by Hercules Company), 425 parts of xylene, and 425 parts of n-butanol were kneaded in a sand mill for 2 hours to prepare a blue ink composition.

Then, a yellow ink composition was prepared in the same manner except that 80 parts of Aizencathilon Yellow 3GLH (C.I. 48055, manufactured by Hodogaya Kagaku K.K.) was used in place of 80 parts of the above-mentioned Eisen Basic Cyanine 6GH.

On the other hand, 200 parts of phosphomolybdic acid, 60 parts of Kayaset Brown 939 (an oil-soluble dye manufactured by Nihon Kayaku K.K.), and 50 parts of ethyl cellulose (EC-N7CP, manufactured by Hercules Company) were kneaded with 690 parts of a solvent mixture of toluene and isopropyl alcohol in a ratio of 1:2 in a sand mill for 1 hour to prepare a brown colored resist ink composition.

A coated paper prepared by uniformly coating a kraft paper with the liquid resin composition obtained in Example 3 with an air knife followed by drying was used as a substrate sheet. This sheet was printed with an abstract pattern with the brown colored resist ink composition by the screen process. Further, the sheet was printed with the blue and yellow ink compositions by the gravure process so that the two ink composition might be partly mixed with each other, whereby a printed sheet of yellow, blue and green colors was obtained.

The entire surface of the outermost layer of the printed sheet was coated with a liquid resin composition similar to that obtained in Example 3 by the gravure process, whereupon a transfer sheet was obtained.

This transfer sheet was superposed on cloth of a diacetate fiber so that the coated surface thereof might be in contact with the cloth, and subjected to a transfer process with a continuous transfer printing machine at 205° C. for 25 seconds. Thus, beautiful transfer-printed cloth with the brown abstract pattern resisted against a ground of yellow, blue and green colors was obtained.

EXAMPLE 7

80 parts of Kayaset Blue TDF (a dye manufactured by Nihon Kayaku K.K.), 50 parts of Sumikaron Yellow 4GL(C.I. Disperse Yellow 51, manufactured by Sumitomo Kagaku K.K.), 60 parts of hydroxypropyl cellulose (Klucel-LF), 700 parts of isopropyl alcohol, and 110 parts of water were kneaded in a sand mill for 1.5 hours to prepare an aqueous green ink composition.

350 parts of cupric chloride, 40 parts of ethyl cellulose (EC-N7CP, manufactured by Hercules Company), 50 parts of a natural resin-modified phenolic resin (Beckacite 1126, manufactured by Nihon Reichhold K.K.), 400 parts of xylene, 80 parts of n-butyl acetate, and 80 parts of n-butanol were kneaded in a ball mill for 3 days to prepare a resist ink composition.

The entire surface of a parchment paper as a substrate sheet was first coated with the green ink composition by the roller coating method and dried to obtain a printed sheet. Then, this sheet was printed with a marble pattern with the resist ink composition by the gravure process to obtain a transfer sheet.

The transfer sheet was superposed on cloth of a polyester-cotton blended yarn so that the coated surface might be in contact with the cloth, and subjected to a transfer operation with a flat-bed heat presser at 180° C. for 60 seconds, whereby transfer-printed cloth was obtained.

The transfer-printed cloth thus obtained was very colorful, the portion corresponding to that of the transfer sheet coated with the resist ink being yellow because only the blue ink was resisted, the remaining portion being green, and transitional portions varying gradually from green to yellow.

EXAMPLE 8

A transfer sheet was produced in the same manner as in Example 7 except that the substrate sheet was coated with the ink composition and resist ink composition in reverse order, and a transfer-printed cloth was obtained by the same transfer process.

There was no trouble due to the reverse order of the coatings, and similar colorful transfer-printed cloth was obtained.

EXAMPLE 9

400 parts of tetraalkyl titanate ($[CH_3(CH_2)_3O]_4Ti$), 90 parts of ethyl cellulose (EC-N7CP, manufactured by Hercules Company), 300 parts of toluene, and 210 parts of isopropyl alcohol were stirred in a stirrer to prepare a solution of a resist ink composition.

100 parts of Kayaset Scarlet 926 (a disperse dye manufactured by Nihon Kayaku K.K.), 100 parts of hydroxypropyl cellulose, 400 parts of xylene, and 400 parts of isopropyl alcohol were kneaded in a sand mill for 2 hours to prepare a scarlet ink composition.

Then, a blue ink composition was prepared in the same manner except that 100 parts of the Kayaset Scarlet 926 was replaced by 10 parts of Kayaset PTB-11.

A wood free paper was printed with the (1) resist ink composition, (2) scarlet ink composition, and (3) blue ink composition in the following six sets of orders:

| | | | |
|---|---|---|---|
| 1. | (1) → (2) → (3) | 2. | (1) → (3) → (2) |
| 3. | (2) → (1) → (3) | 4. | (2) → (3) → (1) |
| 5. | (3) → (1) → (2) | 6. | (3) → (2) → (1) |

The paper was printed with the compositions (2) and (3) by the gravure process on the entire surface thereof, and with the composition (1) by the gravure process with a plate patterned in lines. The resulting transfer sheets were used to transfer-print silk cloth by an ordinary method.

Six kinds of transfer-printed cloths wherein the pattern in scarlet lines was clearly resisted against a dark-brown ground were obtained.

EXAMPLE 10

A resist ink having the following composition was used in place of the resist ink in Example 9.

| | | |
|---|---|---|
| (1)' | Isopropylaluminum acetoacetate | 500 parts |
| | Ethyl cellulose (EC-N7CP, mfd. by Hercules Co.) | 40 parts |
| | Xylene | 300 parts |
| | N—butanol | 160 parts |

Six kinds of transfer sheets were obtained in the same sets of printing orders as in Example 9, using the resist ink composition (1)' described above and the other ink compositions (2) and (3).

Each of these sheets was used for transferring onto woolen cloth by an ordinary method with a flat-bed heat presser at 170° C. for 60 seconds, whereby transfer-printed cloth having a pattern in lines resisted against a brown ground and the resisted portions were precisely colored with scarlet was obtained.

EXAMPLE 11

| (a) | Dye ink composition: | |
|---|---|---|
| | Mitsui PS Red G (C.I. Solvent Red 146, mfd. by Mitsui Toatsu Kagaku K.K.) | 10 parts |
| | Ethyl cellulose (EC-N7CP, mfd. by Hercules Co.) | 8 parts |
| | Turkey red oil (mfd. by Daiichi Kōgyō Seiyaku K.K.) | 3 parts |
| | Solvent mixture (xylene:n-butyle acetate = 3:1) | 79 parts |

The above ingredients were mixed and kneaded in a ball mill to prepare a red ink composition.

| (b) | Resist ink composition. | |
|---|---|---|
| | Tetrabutoxytitanium | 30 parts |
| | Ethyl cellulose (EC-N4CP, mfd. by Hercules Co.) | 6 parts |
| | Toluene | 40 parts |
| | Isoprophyl alcohol | 24 parts |

The above ingredients were dissolved and mixed with a stirrer.

A gravure paper was printed with the above dye ink composition (a) by the gravure process with a patterned plate (having a cell depth of 45μ), and, immediately thereafter, printed with the resist ink composition (b) to form a desired pattern, whereby a transfer sheet was obtained.

On the portion coated with the resist ink was formed a tough film due to a crosslinking reaction, which film was not peeled off or broken when subjected to some extent of scrubbing.

The transfer sheet was superposed on cloth of nylon taffeta so that the portion printed with a pattern might be in contact with the cloth, and heated with a flat-bed heat presser for heat transfer at 180° C. for 30 seconds under a pressure of 2 $Kg/cm^2$.

The sheet was then removed, nylon cloth wherein the portion corresponding to that of the transfer sheet printed with the resist ink was resisted with white color against a red ground was obtained.

When heat transfer was carried out with a sheet printed with the dye ink composition and resist ink composition in reverse oreder, transfer-printed cloth with a clearly resisted pattern was similarly obtained.

EXAMPLE 12

The use of the dimer, trimer and tetramer of tetrabutoxytitanium in place of the tetrabutoxytitanium monomer in Example 11 also resulted in resist-printed cloth with beautiful white portions.

EXAMPLE 13

| (a) | Dye ink composition: | |
|---|---|---|
| | Celliton Blue SF 7872 (mfd. by BASF A.G., C.I. Colvent Violet 13) | 15 parts |
| | Hydroxypropyl cellulose (Klucel-LF, mfd. by Hercules Co.) | 10 parts |
| | Isopropyl alcohol | 75 parts |

The above ingredients were mixed and kneaded in a sand mill to prepare a blue ink composition.

A yellow ink composition was prepared in the same manner except that Kayaset Yellow 919 (an azo disperse dye manufactured by Nihon Kayaku K.K.) was used in place of the above blue dye.

| (b) | Resist ink composition: | |
|---|---|---|
| | Aluminum diisopropylate ethylacetoacetate | 35 parts |
| | Cobaltus acetylacetate | 10 parts |
| | Ethyl cellulose (EC-N4CP, Hercules Co.) | 10 parts |
| | Butyl cellosolve | 20 parts |
| | Xylene | 10 parts |
| | N—butyl acetate | 20 parts |

The above ingredients were dissolved and mixed in Threeone motor.

A gravure paper was printed with stripes with the blue dye ink (a) by the gravure process.

Then, the white portions between the blue stripes were printed with the yellow dye ink composition (a) described above.

A transfer sheet with blue and yellow stripes thus obtained was printed with polka dots with the resist ink composition (b) described above by the hand screen process (100 lines/inch).

This transfer sheet was superposed on polyester cloth, and heated under pressure with the flat-bed presser used in Example 11 above at 200° C. for 10 seconds.

By peeling off this sheet, polyester cloth with polka dots resisted against blue and yellow stripes was obtained.

EXAMPLE 14

The yellow dye, Kayaset Yellow 919 (an azo dye manufactured by Nihon Kayaku K.K.), in Example 13 was replaced by Miketon Polyester Brilliant F5B (C.I. Disperse Red 240, manufactured by Mitsui Toatsu Kagaku K.K.).

Since the latter dye did not lose heat transferability due to the resist ink composition, transfer-printed polyester cloth with blue and red stripes showed such an interesting resist effect that only the polka dots on the blue stripes were not dyed with any dye.

EXAMPLE 15

Lullafix Y-8G (a disperse dye manufactured by BASF A.G., C.I. Disperse Yellow 13) was dispersed in the resist ink composition (b) in Example 11 to prepare a colored resist ink composition.

A transfer sheet coated with this resist ink composition by the gravure process as in Example 11 was heated under pressure for transfer resist-printed nylon cloth wherein the portion corresponding to that of the transfer sheet printed with the resist ink was yellow and the ground was red was obtained.

EXAMPLE 16

| (a) | Dye ink composition: | |
|---|---|---|
| | Kayact Blue F (disperse dye mfd. by Nihon Kayaku K.K.) | 6.5 parts |
| | Ethyl cellulose (EC-N7CP, mfd. by Hercules Co.) | 7.0 parts |
| | Monopol 110G (mfd. by Kenseido Kagaku Kōgyō K.K.) | 3.5 parts |
| | Solvent | 83 parts |

The above ingredients were mixed and kneaded in a ball mill to prepare a blue ink composition.

A red ink composition was prepared by replacing the blue dye described above by Miketon Polyester Brilliant Pink FFB (C.I. Vat Red 41, manufactured by Mitsui Toatsu Kagaku K.K.).

| (b) | Resist ink composition: | |
|---|---|---|
| | Tributoxyzirconium ethylacetoacetate | 40 parts |
| | PTY-51 (C.I. Disperse Yellow 71, mfd. by Mitsubishi Kasei K.K.) | 4 parts |
| | Ethyl cellulose (EC-N4CP, mfd. by Hercules Co.) | 10 parts |
| | Solvent (xylene:n-butanol = 3:1) | 46 parts |

The above ingredients were mixed and kneaded in a ball mill to prepare a colored resist ink composition.

A gravure paper was printed with a desired pattern with the blue and red inks described in (a) by the gravure process, and subsequently with a floral pattern with the resist ink composition (b).

A heat transfer sheet thus prepared was covered with a tough film in spite of the high solids content of the resist ink composition, which film was not peeled off upon folding.

The heat transfer sheet was superposed on polyester cloth, and subjected to the same transfer process as that employed in Example 11.

By peeling off this sheet, there was obtained transfer-printed cloth with yellow floral patterns, in the portions corresponding to those of the transfer sheet printed with only the resist ink composition and with the blue ink under the resist ink composition, and orange floral patterns due to colored resist printing effect in the portion corresponding to that of the transfer sheet printed with the red ink under the resist ink composition.

EXAMPLE 17

80 parts of methyl cellulose (Metrose 65 BH 50, Daiichi Kogyo Seiyaku K.K.), 70 parts of dextrin (Special Dextrin B, Saiden Kagaku K.K.), 20 parts of isopropyl alcohol, 820 parts of water, and 10 parts of a defoaming agent (Nopco DF-122, San Nopco Company) were stirred and dissolved with a stirrer to prepare a resin composition.

This resin composition was applied by the gravure process over the entire surface of each of the heat transfer sheets obtained in Examples 11 through 16 as shown in FIGS. 3, 4 and 7 to provide resin layers, whereupon the desired effects, such as prevention of contamination of transfer sheets during storage and close contact between cloths and transfer sheets which ensures clear transfer printing with no blur in desired patterns, were obtained.

We claim:

1. A dry transfer printing process which comprises:

preparing a transfer sheet of laminated construction comprising a substrate sheet, a coloring layer of a desired pattern disposed on one side of the substrate sheet and containing a heat transferable dye as a coloring agent, said dye being selected from the group consisting of disparse dyes, basic dyes, acidic dyes, and oil soluble dyes, and a resist layer of a desired pattern disposed on said one side of the substrate sheet, either above or below the coloring layer, and containing a metal compound for resist printing by chemical action and a binder, wherein the metal compound for resist printing is a compound consisting of one metal selected from chromium, iron, copper, nickel, and cobalt combined with one radical selected from the radicals of hydrochloric acid, nitric acid, acetic acid, formic acid, and oxalic acid, the metal compound for resist printing being capable of causing the coloring agent to lose its heat transferability;

superposing the transfer sheet on an article to be transfer-printed in a manner such that the side of the transfer sheet provided with the coloring layer and the resist layer contacts the article thereby to form a superposed structure; and heating the superposed structure so as to selectively heat transfer the coloring agent having heat transferability in parts of the coloring layer which are not laminated with the resist layer to the article to be transfer-printed.

2. A transfer process as claimed in claim 1 in which the coloring agent is a dye selected from the group consisting of disperse dyes and oil-soluble dyes.

3. A transfer process as claimed in claim 1 in which the coloring agent is a dye having at least two groups having unshared electron pairs selected from the group consisting of —N═N—, —OH, —COOH, >C═O, and $—NH_2$.

4. A transfer process as claimed in claim 1 in which the resist layer and the coloring layer have mutually overlapping portions in which 0.1 to 10 moles of the metal compound for resist printing is used for 1 mole of the coloring agent.

5. A transfer process as claimed in claim 1 in which the coating film weight on a dry basis is 0.01 to 40 grams/sq.meter for the coloring layer and 0.05 to 70 grams/sq.meter for the resist layer.

6. A transfer process as claimed in claim 1 in which the coloring layer contains from 5 to 99 percent by weight of the binder and a remainder of the coloring agent and desired additives, and the resist layer contains from 5 to 99 percent by weight of the binder and a remainder of the metal compound for resist printing and desired additives.

7. A transfer process as claimed in claim 1 in which a resin film is interposed between any two members selected from the substrate sheet, the resist layer, and the coloring layer.

8. A transfer process as claimed in claim 1 in which the coloring layer further contains a coloring agent which retains its heat transferability even when it contacts the metal compound for resist printing.

9. A further process as claimed in claim 1 in which the resist layer further contains a coloring agent which retains its heat transferability even when it contacts the metal compound for resist printing.

10. A transfer process as claimed in claim 1 which has a non-resist coloring layer containing a coloring agent which retains its heat transferability even when it contacts the metal compound for resist printing and interposed between any two members selected from the substrate sheet, the resist layer, and the coloring layer.

11. A transfer process as claimed in claim 1 in which the color layer contains 0.1 to 20 moles per mole of the coloring agent of a heat transfer promoting agent having the property of acting on the coloring agent and increasing the heat transferability thereof.

12. A transfer process according to claim 1 wherein said heating is at a temperature of 80° C. to 250° C.

13. A transfer process according to claim 12 wherein said heating is continued for approximately 5 to 90 seconds.

14. A transfer process according to claim 12 wherein said heating is conducted under a pressure of approximately 50 grams/$cm^2$ to 20 kilograms/$cm^2$.

15. A transfer process as claimed in claim 1 in which the coloring agent is an anthraquinone dye.

16. A transfer process as claimed in claim 15 in which the coloring agent is an anthraquinone having an OH group at the $\alpha$ position.

17. A transfer process as claimed in claim 1 which has a resin film above the resist layer and the coloring layer.

18. A transfer process as claimed in claim 17 in which the weight per unit area of the resin film on a dry basis is 0.2 to 4 grams/sq.meter.

19. A transfer process as claimed in claim 1 which has, above the resist layer and the coloring layer, a non-resist coloring layer containing a coloring agent which retains its heat transferability even when it contacts the metal compound for resist printing.

20. A transfer process as claimed in claim 19 in which the weight per unit area on a dry basis of the non-resist coloring layer is 0.01 to 110 grams/sq. meter, and the non-resist coloring layer contains from 5 to 99 percent by weight of a binder and a remainder of a non-resist coloring agent and desired additives.

* * * * *